United States Patent
Manley

(10) Patent No.: US 12,099,826 B2
(45) Date of Patent: Sep. 24, 2024

(54) MANAGING SOFTWARE PATCHES BASED ON AUTOMATED RULE-BASED ANALYSIS AND TESTING

(71) Applicant: MASTERCARD INTERNATIONAL INCORPORATED, Purchase, NY (US)

(72) Inventor: Eric Manley, Eureka, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 202 days.

(21) Appl. No.: 17/545,717

(22) Filed: Dec. 8, 2021

(65) Prior Publication Data

US 2022/0179639 A1  Jun. 9, 2022

Related U.S. Application Data

(60) Provisional application No. 63/123,367, filed on Dec. 9, 2020.

(51) Int. Cl.
*G06F 9/44* (2018.01)
*G06F 8/61* (2018.01)
*G06F 8/65* (2018.01)
*G06F 8/75* (2018.01)

(52) U.S. Cl.
CPC ............. *G06F 8/65* (2013.01); *G06F 8/61* (2013.01); *G06F 8/75* (2013.01)

(58) Field of Classification Search
CPC ..... G06F 8/65; G06F 8/61; G06F 8/70; G06F 8/71; G06F 8/60; G06F 8/658; G06F 11/3688; G06F 3/123; G06F 3/1225; G06F 2212/152; G06F 8/75

USPC .................................................. 717/168–178
See application file for complete search history.

(56) References Cited

U.S. PATENT DOCUMENTS

| | | | |
|---|---|---|---|
| 8,245,216 | B2 | 8/2012 | Felts |
| 9,098,375 | B2 | 8/2015 | Narkinsky et al. |
| 9,280,374 | B2 | 3/2016 | McNeill |
| 9,563,417 | B2 | 2/2017 | Jha et al. |
| 9,983,864 | B2 | 5/2018 | Dias de Assuncao et al. |
| 10,042,625 | B2 * | 8/2018 | El Maghraoui ......... G06F 40/30 |
| 2004/0210653 | A1 | 10/2004 | Kanoor et al. |
| 2005/0188258 | A1* | 8/2005 | Zweifel ..................... G06F 8/65 |
| | | | 714/23 |

(Continued)

*Primary Examiner* — Chuck O Kendall
(74) *Attorney, Agent, or Firm* — Barta Jones, PLLC

(57) ABSTRACT

The disclosure herein describes managing software patches for software applications of computing devices. A release of a software patch associated with a software application of the computing devices is detected. The software patch is analyzed based on patch analysis rules, wherein the patch analysis rules include vulnerability rules configured to indicate whether the released software patch addresses known vulnerabilities. Based on the analysis resulting in approval for installation of the patch, a current test image of the software application is identified, and the patch is applied to the test image to form a patched image. Tests are performed on the patched image, include patch-specific tests. Based on the results of the tests indicating that the patched image passed at least a subset of the tests, the software patch is applied to application instances of the software application on the computing devices, whereby the patch is deployed to the computing devices.

20 Claims, 6 Drawing Sheets

(56) References Cited

U.S. PATENT DOCUMENTS

2006/0080656 A1\* 4/2006 Cain .................. G06F 8/65
　　　　　　　　　　　　　　　　434/118
2013/0326494 A1　12/2013　Nunez \* cited by examiner

MANAGING SOFTWARE PATCHES BASED ON AUTOMATED RULE-BASED ANALYSIS AND TESTING

CROSS-REFERENCE TO RELATED APPLICATION

This application claims the benefit of U.S. Provisional Application No. 63/123,367 filed Dec. 9, 2020, entitled "Managing Software Patches Based on Automated Rule-Based Analysis and Testing", the entirety of which is hereby incorporated by reference herein.

BACKGROUND

In some enterprise systems or other systems with many distributed computing devices, the process of applying patches or other updates to operating systems (OS's) or other software applications includes many steps that must be completed manually by a user. Such manual steps take up large amounts of the user's time and they can be very repetitive (e.g., repeatedly accessing computing devices in the system, installing patches on each computing device, and then executing tests on each device after the patches are installed). Ensuring that the devices of the system are up to date is crucial for keeping the system secure and running efficiently, but the manual steps necessary to implement the required updates and patches consume substantial amounts of users' effort and time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for managing software patches for software applications of computing devices is described. A new release of a software patch that is associated with a software application installed on the computing devices is detected. The software patch is analyzed based on patch analysis rules automatically, wherein the patch analysis rules are configured to indicate whether the released software patch is to be applied to the software application, wherein the patch analysis rules include vulnerability rules configured to indicate whether the released software patch addresses known vulnerabilities. Based on the analysis of the software patch resulting in approval for installation, a current test image of the software application is identified, and the patch is applied to the test image to form a patched image. Tests are performed on the patched image, including patch-specific tests. Based on the results of the tests indicating that the patched image passed at least a subset of the tests, the software patch is applied to application instances of the software application on the computing devices, whereby the patch is deployed to the computing devices.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Figure 1:
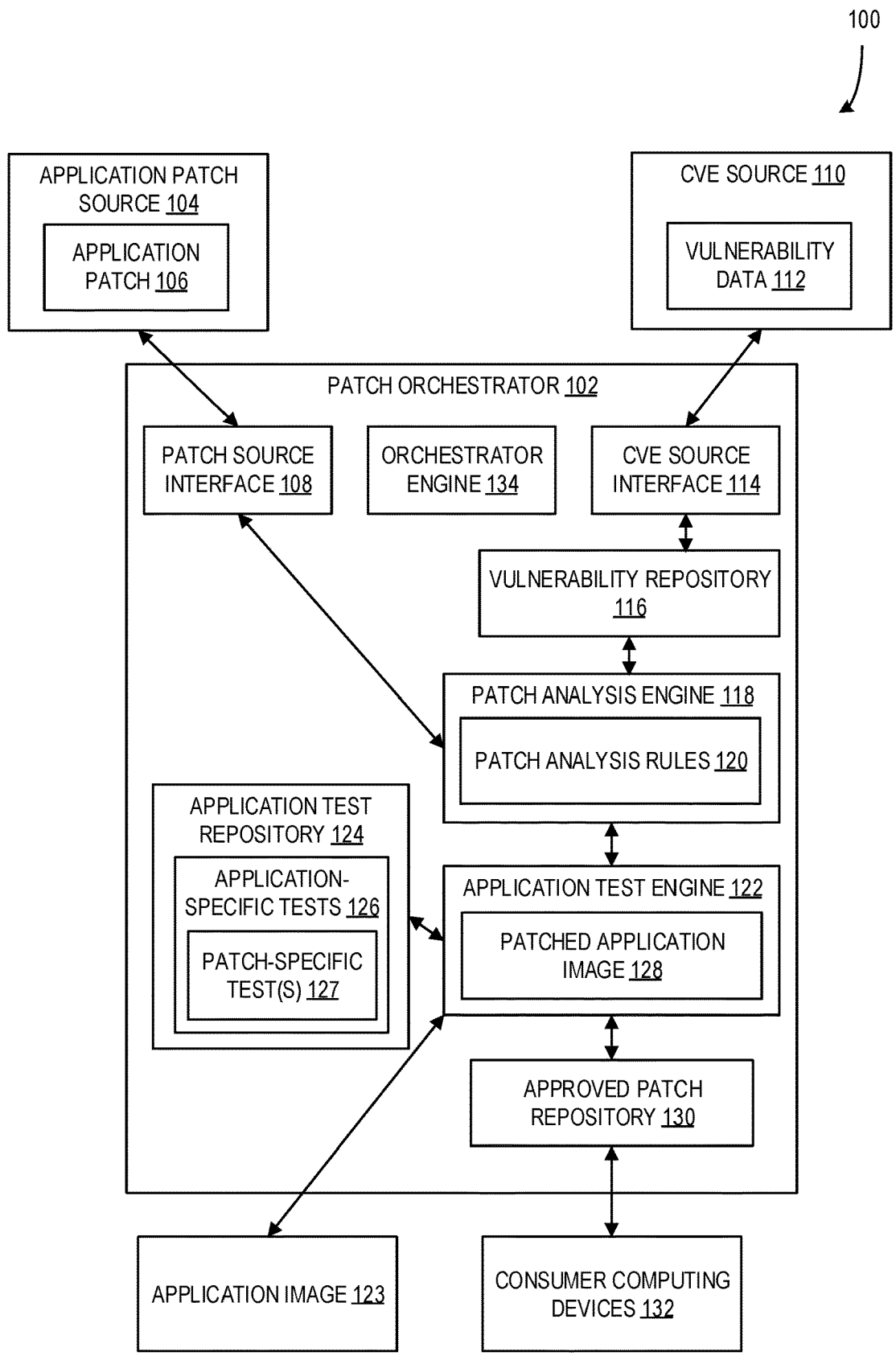
FIG. 1 is a block diagram illustrating a system configured for managing patch testing and deployment according to an embodiment.

Aspects of the disclosure provide a computerized method and system for managing software patches for software applications of computing devices. In a system, new releases of software patches are detected. The software patches are analyzed based on patch analysis rules automatically. In particular, the patch analysis rules include vulnerability rules that indicate whether the patches address known vulnerabilities. Based on the analysis of the software patches resulting in approval for installation, current test images of software applications are identified, and the patches are applied to the test images to form patched images. Tests are performed on the patched images, including patch-specific tests. Based on the results of the tests indicating that patched images have passed, the software patches that have passed are applied to application instances of the software applications on the computing devices.

The disclosure addresses the challenges of detecting, deploying, and otherwise managing the process of patching software applications across a set of computing devices within an enterprise system or other distributed system. The described methods and systems automatically determine whether a detected patch is applicable to the computing devices of the distributed system as well as determining whether deployment of the detected patch is an efficient use of resources (e.g., how much downtime will be caused by deployment of the patch). Further, testing of patches to be deployed is also performed automatically on images that mirror the applications installed throughout the distributed system, including tests that specifically test the patch being deployed. The disclosure operates in an unconventional way at least by enabling the creation and application of a robust and flexible set of patch analysis rules that can be customized to define exactly which patches or types of patches should be tested and deployed on the system. Particularly, some patch analysis rules may be defined based on known vulnerabilities and/or exploits, the records of which are monitored and updated automatically. Further, the disclosure generates and maintains test images of software applications and uses those test images to perform sets of tests on patches to be deployed to confirm that the patches are effective and do not negatively affect the operation of the system. The automatic processes of the disclosure enable the optimization of management of incoming patches and substantially reduce the time and effort required by users performing manual patching activities within the system. Further, the disclosure is configured to optimize the deployment of patches in complex distributed systems, reducing the total time required to test and deploy patches and thereby reducing the time during which the system is vulnerable to newly discovered exploits before associated patches are deployed. Additionally, the described automatic patch analysis may provide users with information about each incoming patch, enabling the users to optimize those activities which may still require user input or action, such as test creation.

FIG. 1 is a block diagram illustrating a system 100 configured for managing patch testing and deployment according to an embodiment. The system 100 includes a patch orchestrator 102 module that is configured to communicate and/or interact with an application patch source 104, a Common Vulnerabilities and Exposures (CVE) source 110, and one or more consumer computing devices 132 as described herein. The patch orchestrator 102 includes hardware, firmware, and/or software that is configured to monitor application patches 106 via the application patch source 104 and current vulnerability data 112 of the CVE source 110 and, based on the results of that monitoring process, analyze and test application patches 106 to determine whether the patches 106 should be deployed for use by the consumer computing device 132.

The patch orchestrator 102 includes a patch source interface 108 configured to enable communication and/or interaction between the patch orchestrator 102 and the application patch source 104. In some examples, the application patch source 104 includes one or more repositories or other data stores associated with entities that produce software applications and/or associated application patches 106 (e.g., the application patch source 104 includes a public repository of application patches 106 for an operating system (OS) that are provided by a company that develops and maintains the OS). The patch source interface 108 may be configured to monitor the application patch sources 104 to determine when new application patches 106 are published for use by the users of the associated software applications. The patch source interface 108 may be configured to communicate with the application patch sources 104 periodically (e.g., once a day, every 30 minutes, etc.) and/or based on another trigger (e.g. identification of a new patch for a particular software application may trigger the patch source interface 108 to trick on application patch sources 104 associated with other software applications that are used with, rely on, or are otherwise associated with the particular software application). Alternatively, or additionally, the patch source interface 108 may include exposed interfaces (e.g., application programming interfaces (APIs)) configured to receive application patch information from the application patch sources 104, such that, when a source 104 releases a new application patch 106, the source 104 notifies the patch source interface 108.

An application patch 106 on an application patch source 104 includes data (e.g., files) associated with a software application that indicates one or more changes to be made to the software application (e.g., configuration changes, settings changes, changes to core functionality of the application). Application patches 106 may be provided by developers of the associated software application to fix issues with the functionality of the application, issues with security of the application, or the like. It should be understood that the application patches 106 may include one or more software patches of any type for one or more different software applications without departing from the description herein. In some examples, an application patch 106 includes metadata that may be used to identify the patch and/or analyzed whether the patch 106 should be installed and/or deployed as described herein. The patch 106 metadata may include values indicating the application with which the patch 106 is associated, a version or versions of the application with which the patch 106 is compatible, purpose or goal information of the patch 106 (e.g., the patch 106 is configured to address a list of issues and/or vulnerabilities), dependencies of the patch 106 (e.g., other patches upon which the patch 106 relies and/or other patches that rely on the patch 106). Further metadata may include a size of the patch 106, specific files or other portions of the application that are affected by the patch 106, and/or specific data indicating what changes are made when the patch 106 is installed on a system. In some examples, this patch 106 metadata is obtained by the patch orchestrator 102 via the patch source interface 108 and provided to the patch analysis engine 118 to enable analysis of the patch 106 as described herein.

The CVE source 110 includes one or more data sources that provide data about current and/or past known vulnerabilities and/or exposures of software applications. In some examples, the CVE source 110 is a service or services are configured to provide up-to-date information about software vulnerabilities, exposures, and exploits as they are recognized and/or discovered. As with the patch source interface 108, the CVE source interface 114 may be configured to check the CVE source 110 for new vulnerability data periodically or based on another triggering event. Alternatively, or additionally, the CVE source interface 114 may expose APIs configured to receive vulnerability data 112 from the CVE source 110 as it is released (e.g., via subscription to one or more CVE source services).

Vulnerability data 112 of the CVE sources 110 include data and metadata identifying specific vulnerabilities of software applications. In some examples, the vulnerability data 112 includes names or identifiers of vulnerabilities, effects of vulnerabilities, and software applications and/or application versions affected by vulnerabilities. Further, vulnerability data 112 may include information indicating length of time the vulnerability has been known, whether the vulnerability has been solved, or the like. The vulnerability data 112 of the CVE sources 110 that is accessed by the CVE source interface 114 may be stored in the local vulnerability repository 116 of the patch orchestrator 102.

The vulnerability data 112 stored in the vulnerability repository 116 may be used by the patch analysis engine 118 when analyzing application patches 106. In some examples, the vulnerability data 112 is used to create and/or change patch analysis rules 120 that are associated with vulnerabilities represented in the vulnerability data 112, such that the analysis engine 118 is enabled to accurately determine whether a patch 106 addresses a particular vulnerability, as described herein. The vulnerability repository 116 may be populated with vulnerability data 112 associated with all the known vulnerabilities from the CVE source 110. Alternatively, the vulnerability data 112 stored in the vulnerability repository 116 may be based on a subset of the known vulnerabilities (e.g., the vulnerabilities that affect the software applications used on the consumer computing devices 132).

The patch analysis engine 118 of the patch orchestrator 102 is configured to analyze application patches 106 based on patch analysis rules 120 in order to determine whether the application patches 106 should be tested and deployed to the consumer computing devices 132. In some examples, the patch analysis engine 118 receives an application patch 106 from the patch source interface 108 and applies one or more of the patch analysis rules 120 to data and/or metadata of the application patch 106. In some examples, the application of the patch analysis rules 120 to the data and/or metadata is triggered automatically or otherwise without user interaction based on receiving the application patch 106 (e.g., the engine 118 is configured to apply a set of patch analysis rules 120 to each patch 106 received automatically upon receiving each patch 106). The results of evaluation of the patch analysis rules 120 are then used to determine whether the application patch 106 is accepted or rejected. If accepted, the application patch 106 is then tested by the application test engine 122 as described herein, but if rejected, the application patch 106 is not tested further and it is not deployed to the consumer computing devices 132.

In some examples, patch analysis rules 120 are generated or otherwise defined to evaluate one or more data values associated with an incoming application patch 106 and provide a result to be used in combination with results from other rules 120. For instance, a patch analysis rule 120 may be defined to compare an "application name" metadata value of an application patch 106 to a list of application names of the applications that are used on the consumer computing devices 132. If the application name metadata value matches one of the application names of the list, the evaluation of the rule 120 may be a "pass", meaning that the application patch 106 is not rejected, at least based on this one rule 120. Alternatively, if the application name metadata value does not match any of the application names on the list, the evaluation of the rule 120 may be a "fail", meaning that the application patch 106 is rejected and no further rule evaluation is necessary.

Other patch analysis rules 120 may be configured to identify the names or identifiers of vulnerabilities in the metadata of application patches, version numbers of applications to which the patches apply, and/or particular types of changes that are performed when patches are installed. Further, some patch analysis rules 120 may be configured to determine whether downtime of a computing device is required and/or how much downtime will be required to deploy the patch. It should be understood that, in other examples, more, fewer, or different types of patch analysis rules 120 may be used to analyze application patches 106 without departing from the description herein.

Further, while some patch analysis rules 120 may provide pass or fail results, other patch analysis rules 120 are configured to provide ratings, score values, or the like, such that the applicability of a particular application patch 106 to the consumer computing devices 132 with which the patch orchestrator 102 is associated can be evaluated with granularity. For instance, the result values of a first set of patch analysis rules 120 may be weighted higher or more significant than the result values of a second set of patch analysis rules 120, such that the first set of rules 120 have a greater effect on whether a patch 106 is approved than the second set of rules 120 (e.g., if a result value of a first rule 120 is multiplied by a weight value of 0.4 and a result value of a second rule 120 is multiplied by a weight value of 0.2, the result of the first rule has twice the effect on the final evaluation of the patch that the second rule does).

Additionally, in some examples, some rules 120 may reduce the likelihood that a patch 106 is approved (e.g., the result value may be negative when a positive value indicates approval of the patch). For instance, a rule 120 may be configured to determine that a patch 106 addresses a vulnerability associated with the Secure Hash Algorithm 1 (SHA-1) when the systems with which the patch orchestrator 102 are associated use different and/or better types of algorithms. If it is determined that a patch 106 does address such a vulnerability, the result value of the rule 120 may be configured to reduce the chance that the patch 106 is approved for deployment.

In some examples, where the results of a plurality of patch analysis rules 120 are evaluated, the score values and/or other results of the rules 120 may be combined into a single aggregate score value (e.g., score values of individual rules 120 may be added together, multiplied by various weight values or other factors, or otherwise combined). The aggregate score value associated with the evaluation of an application patch 106 may then be compared to one or more threshold values to determine whether the patch 106 will be tested and potentially approved for deployment to the consumer computing devices 132. For instance, in an example, the patch analysis rules 120 are configured such that analysis of a patch 106 results in an aggregate score value between 0 and 100. A threshold value of 70 is defined, such that patches with aggregate score values that meet or exceed 70 are approved for testing, while patches with aggregate score values of less than 70 are not approved for testing or deployment.

Still further, evaluation of some patch analysis rules 120 may change the threshold value at which a patch 106 is approved for testing. For instance, a rule 120 may be defined that reduces the threshold value for approval when it is determined that a patch 106 addresses a particularly important and/or urgent vulnerability, making it more likely that a patch 106 addressing that vulnerability is approved for testing and potential deployment.

It should be understood that, in some examples, some or all of the described types of patch analysis rules 120 and/or other similar types of rules may be used in combination to evaluate whether an application patch 106 will be approved with a great deal of flexibility and granularity without departing from the description herein. The patch analysis rules 120 may be defined by users of the system (e.g., engineers, technicians, system managers) and/or automatically generated by the patch orchestrator 102 or another related component of the system (e.g., based on detection of new vulnerabilities or exposures from the CVE source 110, new rules 120 may be automatically generated that detect when a patch 106 addresses the new vulnerabilities or exposures). Such automated rule generation may include generating rules that are configured to evaluate metadata associated with the vulnerabilities or exposures (e.g., metadata values that include names or identifiers of the vulnerabilities or exposures) and/or based on information associated with what portions of the software application that are affected by the vulnerabilities or exposures (e.g., keywords associated with the effects of a vulnerability).

The patch orchestrator 102 includes an application test engine 122 configured to receive application patches 106 and associated information from the patch analysis engine 118 and perform testing thereon to determine whether the patches 106 should be deployed onto the consumer computing devices 132. The application test engine 122 is configured to obtain an up-to-date application image 123 of the application with which the patch 106 is associated, apply the patch 106 to the image 123 to form a patched application image 128, and apply tests, including application-specific tests 126, including at least one patch-specific test 127, to the patched application image 128. The results of the applied tests are used to determine whether to add the tested patch 106 to the approved test repository 130 for deployment to the consumer computing devices 132.

In some examples, obtaining an up-to-date application image 123 includes the application test engine 122 retrieving the image 123 from a repository of up-to-date application images. In such an example, a set of images may be maintained by the patch orchestrator 102 or by another component of the system that includes up-to-date images of some or all applications that are being used by the consumer computing devices 132 of the system. Obtaining the application image 123 may include downloading a copy of the image 123 from the repository to memory or other data storage of the application test engine 122, such that the patch may be installed thereon without affecting the current up-to-date image on the repository. Alternatively, or additionally, the application test engine 122 may be configured to obtain information indicating a current state and/or version of the application as installed on the consumer computing devices 132 and generate an up-to-date application image 123 from that information. The generation and/or use of the application image 123 may include installation of the image 123 on a computing device with in a testing environment, such as a server device, associated with the patch orchestrator 102 and/or on a virtual machine (VM) or other virtual computing instance (VCI). Such a testing device, VM, or VCI may be configured to be used only by the application test engine 122 during the performance of patch testing as described herein, such that any issues caused by the installation of a patch 106 are limited only to the testing device, VM, or VCI.

In further examples, testing a patch 106 by the application test engine 122 may include performing tests 126 and/or 127 on multiple different patched application images 128 and/or on images 128 installed on different testing devices. For instance, if the system includes devices that are configured to run multiple versions of the application, the application test engine 122 may be configured to generate a patched application image 128 for each version of the application that is present and run tests on each of the generated patched application images 128. Additionally, or alternatively, if the consumer computing devices 132 include multiple types of devices, the application test engine 122 may be configured to install patched application images 128 on virtual testing instances that simulate each of the types of devices, such that the patch 106 is tested for each of the types of devices.

The application test repository 124 of the patch orchestrator 102 is configured to store tests and associated data for use by the application test engine 122. The repository 124 stores application-specific tests 126 for each application that may be tested by the test engine 122, including one or more patch-specific tests 127 that may be used in the testing of particular patches to verify that a patch is effective and/or that the patch does not create additional issues. Additionally, or alternatively, the application test repository 124 includes other types of tests, such as general tests that are applicable to variety of different applications and/or computing devices or device type-specific tests for testing functionality of specific types of computing devices, such as server devices.

The application test repository 124 is configured to provide tests, including the application-specific tests 126 and patch-specific tests 127, and associated information (e.g., setup or configuration information to enable performance of the tests) to the application tests engine 122 in response to queries or requests from the engine 122. The provided set of test information in response to a request from the test engine 122 may include one or more tests, and those tests may include general tests, application-specific tests 126, and/or patch-specific tests 127 in any combination without departing from the description herein. The tests in the repository 124 may be defined by users of the system (e.g., test engineers) and stored in the application test repository 124 in such a way that they are accessible to the test engine 122. In some examples, tests in the test repository 124 are associated with metadata that is used to organize the tests and to identify tests to provide to the test engine 122 in response to a request. For instance, a test stored in the repository 124 may include metadata indicating the application with which it is associated, the patch with which it is associated, and/or the type of computing device with which it is associated. Additionally, or alternatively, the metadata may include an indication of what functionality the test is designed to test.

In some examples, when a patch 106 is identified on the application patch source 104 for which patch-specific tests 127 have not been created, the patch orchestrator 102 may be configured to notify a user that the patch lacks patch-specific tests 127. As a result, the user is given the opportunity to review the patch 106 and design one or more patch specific tests 127 that will test the effectiveness of the patch with respect to the functionality of the associated application. In some cases, while the initial patch-specific tests 127 are being designed and/or created, the test engine 122 may be configured to wait to perform any other tests on the patch 106 until the set of tests to perform is complete. After completing the patch-specific tests 127, the user may be enabled to store them in the application test repository 124 as illustrated. Further, by storing the patch-specific tests 127 there, the patch orchestrator 102 may be signaled that the set of tests to run on the patch 106 is complete and, as a result, cause the application test engine 122 to perform the set of tests associated with the application and the patch 106, including the new patch-specific tests 127, on a patched application image 128 as described herein.

Alternatively, or additionally, the patch orchestrator 102 may be configured to automatically generate patch-specific tests 127 based on the application patch 106 to be tested and any available associated data. In some examples, such automatic test generation is performed by a test generation engine that is trained using machine learning techniques. For instance, a set of training data including patch-specific tests mapped to associated patch data is used to initially train the test generation engine and then, patch-specific tests generated by the test generation engine may be reviewed by users for accuracy (e.g., does the test address change(s) made by the patch?) and completeness (e.g., does the test fully test change(s) made by the patch?). The reviews of the generated tests may be provided back to the test generation engine as feedback, which may be used to further train the engine to increase its effectiveness at generating patch-specific tests. In some examples, the test generation engine comprises a trained regressor such as a random decision forest, a directed acyclic graph, a support vector machine, a convolutional neural network or other neural network, or another trained regressor. Such a trained regressor may be trained using the user reviews as feedback data. It should further be understood that the machine learning module, in some examples, operates according to machine learning principles and/or techniques known in the art without departing from the systems and/or methods described herein. In an example, the test generation engine makes use of training data pairs when applying machine learning techniques and/or algorithms. Millions of training data pairs (or more) may be stored in a machine learning data structure. In some examples, a training data pair includes a timestamp-based feedback data value paired with an interval adjustment value. The pairing of the two values demonstrates a relationship between the feedback data value and the adjustment values that may be used by the machine learning module to determine future interval adjustments according to machine learning techniques and/or algorithms. Such interval adjustments are used within the described test generation engine to adjust how patch-specific tests are generated.

The tests 126 and 127 that are performed on the patched application image 128 by the application test engine 122 may include a variety of types of tests without departing from the description herein. For instance, the tests may include unit tests, integration tests, regression tests, performance tests, smoke tests, etc. Tests 126 and 127 may include configuring a set of inputs and/or an associated environment with which to run the patched application image and observing the outputs from the patched application image as it runs or after it runs. If the outputs from the image match the expected output values or are within expected output value ranges, the patch "passes" the test. Alternatively, if the outputs from the image do not match expected output values or are outside of expected output value ranges, the patch "fails" the test. The application test engine 122 may be configured to approve a patch when it passes all of a set of tests or at least a defined portion of the set of tests (e.g., a patch is approved when it passes 90% of the tests).

When a patch 106 is approved by the test engine 122, the test engine 122 transfers the patch 106 to the approved patch repository 130, where it can be obtained by or deployed to consumer computing devices 132. Alternatively, when a patch 106 is not approved due to the results of testing, the patch 106 is not transferred to the repository 130 but may instead be removed from the patch orchestrator 102. In some examples, when a patch 106 does not pass, the test results associated with the patch 106 may be used to generate a report and/or other logging information which may be sent to users of the system for their review. Additionally, or alternatively, regardless of whether a patch 106 is approved or not, the results of the testing and/or the analysis of the patch 106 may be logged and/or otherwise stored with the patch orchestrator 102 or an associated component for review by users of the system, enabling users to validate the accurate performance of the automatic processes described herein.

The consumer computing devices 132 are configured to execute or otherwise run one or more applications as well as communicate and/or interact with the patch orchestrator 102 to patch those applications and keep them up to date. It should be understood that the consumer computing devices 132 are so named because they are configured to "consume" approved patches from the approved patch repository 130 as described herein. Consumer computing devices 132 may include many different computing devices and/or different types of computing devices (e.g., server devices, personal computers, tablet computers, and/or other mobile devices) within a system (e.g., an intranet, enterprise computing system, distributed computing system, or the like). In some examples, the consumer computing devices 132 are configured to periodically check the approved patch repository 130 for new application patches 106 that are associated with applications of the devices 132 and that have not been installed or otherwise deployed to those devices 132. Alternatively, or additionally, the patch orchestrator 102 may be configured to send notifications to consumer computing devices 132 about approved patches that are relevant to the devices 132 when the patches are stored on the approved patch repository 130 and ready for deployment. Further, the patch orchestrator 102 may be configured to push approved patches to consumer computing devices 132 that run applications with which the pushed patches are associated.

The patch orchestrator 102 further includes an orchestrator engine 134 module that is configured to perform a variety of operations to manage, facilitate, and/or control the operations of the other components of the orchestrator 102 as described above. The functionality of the orchestrator engine 134 is described in greater detail below with respect to FIG. 2.

Figure 2:
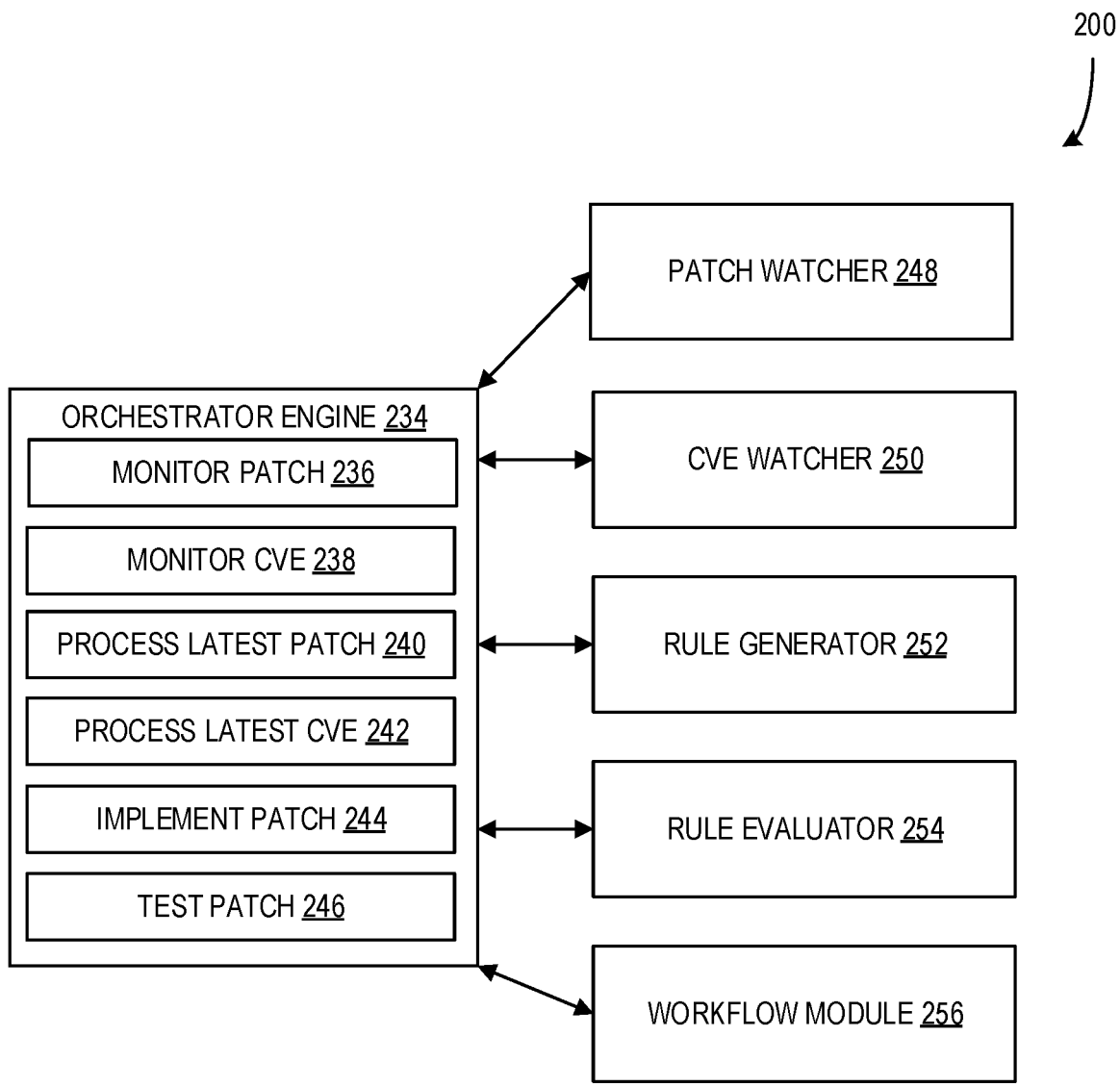
FIG. 2 is a block diagram illustrating an orchestrator engine configured for performing patch management operations of a patch orchestrator module according to an embodiment.

FIG. 2 is a block diagram 200 illustrating an orchestrator engine 234 configured for performing patch management operations of a patch orchestrator module according to an embodiment. The orchestrator engine 234 includes hardware, firmware, and/or software configured to perform a variety of operations, including "monitor patch" 236 operations, "monitor CVE" 238 operations, "process latest patch" 240 operations, "process latest CVE" 242 operations, "implement patch" 244 operations, and "test patch" 246 operations. Each of the described operations 234-244 is performed via one or more associated software modules and, in some cases, the operations 234-244 are configured to interact with other components associated with the patch orchestrator module, including the patch watcher 248, the CVE watcher 250, the rule generator 252, the rule evaluator 254, and the workflow module 256.

The monitor patch 236 operation is configured to communicate with the patch watcher 248 module to detect when new patches and/or new versions of patches are released. In some examples, the patch watcher 248 is a part of or otherwise associated with a patch source interface (e.g., patch source interface 108) that accesses an application patch source (e.g., application patch source 104) and is configured to check one or more application patch sources for new patches. The monitor patch 236 operation may be configured to direct the patch watcher 248 regarding what patches and/or associated applications to track, how often to check for new patches, and/or other associated patch monitoring functionality. Further, the monitor patch 236 operation may be configured to call or otherwise communicate with other operations of the orchestrator engine 234 based on the detection of a newly available patch or other patch-related events (e.g., the monitor patch 236 operation sends a newly detected patch to the process latest patch 240 operation for processing).

Similarly, the monitor CVE 238 operation is configured to communicate with the CVE watcher 250 module to detect when new vulnerabilities and/or exposures are detected or otherwise released. In some examples, the CVE watcher 250 is part of or otherwise associated with a CVE source interface (e.g., CVE source interface 114) that accesses one or more CVE sources (e.g., CVE source 110) and is configured to check the sources for new vulnerability data or the like. The monitor CVE 238 operation may be configured to direct the CVE watcher 250 regarding what vulnerabilities and/or exposures to track, how often to check for new vulnerabilities and/or exposures, and/or other associated CVE monitoring functionality. Further, the monitor CVE 238 operation may be configured to call or otherwise communicate with other operations of the orchestrator engine 234 based on the detection of a newly released vulnerabilities and exposures or other CVE-related events (e.g., the monitor CVE 238 operation sends a newly detected vulnerability data to the process latest CVE 242 operation for processing).

The process latest patch 240 operation is configured to receive a latest patch and/or associated information from the monitor patch 236 operation or another related operation and to process the received patch as described herein. In some examples, processing the patch includes implementing or applying patch analysis rules (e.g., patch analysis rules 120) to the latest patch to determine whether the patch is approved for testing. The application or implementation of the patch analysis rules may be done by the rule evaluator 254 module at the direction of the process latest patch 240 operation. In some examples, the rule evaluator 254 module is part of or otherwise associated with a patch analysis engine (e.g., patch analysis engine 118) as described herein.

The process latest CVE 242 operation is configured to receive the latest vulnerability data and/or associated information from the monitor CVE 238 operation or another related operation and to process the received vulnerability data as described herein. In some examples, processing the vulnerability data includes generating one or more patch analysis rules that are configured to determine whether an analyzed patch addresses the vulnerabilities or exposures described by the vulnerability data. Generation of the one or more patch analysis rules may be done by the rule generator 252 module, which, in some examples, is a part of or otherwise associated with a patch analysis engine (e.g., patch analysis engine 118) as described herein.

The implement patch 244 operation is configured to receive a patch that has been approved for testing (e.g., from the process latest patch 240 operation or another associated operation) and implement or otherwise install the patch to an application image in preparation for testing. In some examples, the implementation or installation of the patch is performed by the workflow module 256, which may be a part of or otherwise associated with an application test engine (e.g., application test engine 122), at the direction of the implement patch 244 operation and the process may include identifying a current application image and performing installation operations on the current application image (e.g., application image 123) to obtain a patched application image (e.g., patched application image 128) as described herein. In some examples, software application versions and/or images may be stored in a repository that is associated with or otherwise in communication with the orchestrator engine 234.

Further, the test patch 246 operation is configured to receive a reference to a patched application image or otherwise access a patched application image (e.g., based on a message from the implement patch 244 operation or another associated operation) and to perform one or more tests on the patched application image and log the results thereof. In some examples, the testing of the patched application image is performed by the workflow module 256 at the direction of the test patch 246 operation. The process may include obtaining tests (e.g., tests 126 and 127) associated with the application and/or patch of the patched application image, performing those tests, and aggregating or otherwise recording the results as described herein with respect to the application test engine (e.g., application test engine 122).

It should be understood that, in some examples, the operations of the orchestrator engine 234 include more, fewer, and/or different operations for managing, analyzing, testing, and/or deploying patches without departing from the description herein.

Figure 3:
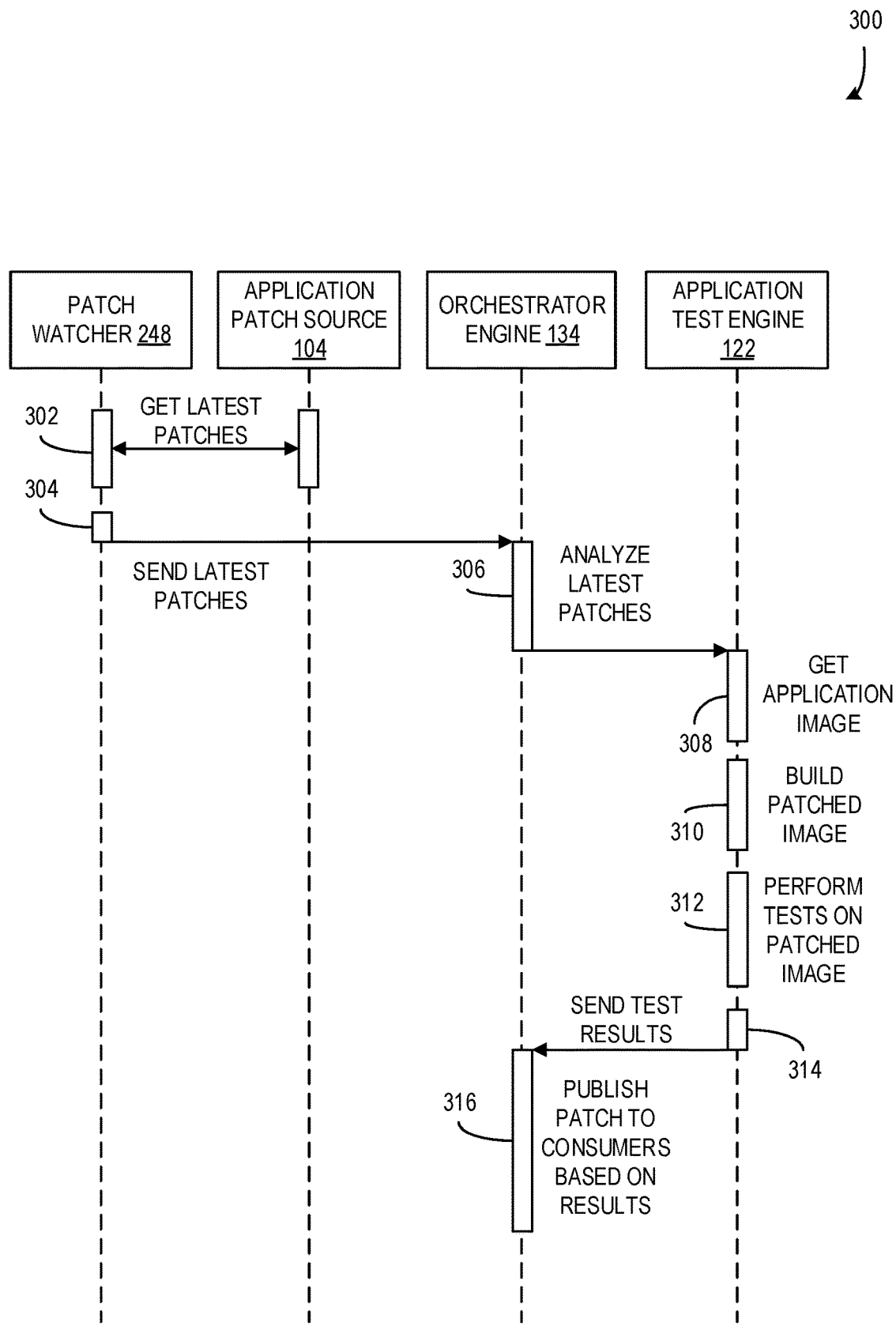
FIG. 3 is a sequence diagram illustrating management of patches from an application patch source according to an embodiment.

FIG. 3 is a sequence diagram 300 illustrating management of patches from an application patch source according to an embodiment. In some examples, the illustrated management processes are performed by or in association with a patch watcher 248, an application patch source 104, an orchestrator engine 134, and an application test engine 122 as described herein. At 302, the patch watcher 248 gets the latest patches from the application patch source 104. In some examples, the patch watcher 248 requests the latest patches from the application patch source 104 continuously, periodically, or based on another interval or trigger. For instance, the patch watcher 248 may be configured to request the latest patches once a day. Alternatively, or additionally, the application patch source 104 may be configured to notify the patch watcher 248 when new patches are available and the patch watcher 248 may be configured to get the latest patches based on receiving such a notification, as described herein (e.g., the patch watcher 248 may be "subscribed" to the application patch source 104 to receive such notifications).

At 304, the patch watcher 248 sends the latest patches to the orchestrator engine 134 and at 306, the orchestrator engine 134 analyzes the latest patches. In some examples, analyzing the latest patches includes applying one or more patch analysis rules to each of the latest patches by a patch analysis engine (e.g. patch analysis engine 118) as described herein. Patches that are approved based on the analysis are sent for testing at the application test engine 122, while patches that are not approved based on the analysis are not sent for testing. In some examples, patches that are not approved based on the testing may be removed from the system. Alternatively, or additionally, users of the system may be notified to enable them to manually review the patch to determine whether the patches should be approved for testing.

At 308, after receiving the set of latest patches that have been approved based on the analysis at 306, the application test engine 122 gets an application image for each application with which the patches are associated. In some examples, getting the application image includes getting or otherwise generating the current or most up-to-date application image (e.g., application image 123 described above) of each application. At 310, the application test engine 122 builds a patched image from the obtained application image by applying the application patch, such that the patched image is configured to operate as the application with the patch that is to be tested installed.

At 312, the application test engine 122 performs tests on the patched image. In some examples, the application test engine 122 is further configured to obtain a set of tests to be performed from a repository (e.g., application test repository 124), wherein the set of tests includes application-specific tests (e.g., application-specific tests 126) and patch-specific tests (e.g., patch- specific tests 127). Further, in some examples, patch-specific tests must be created or otherwise generated after the patch has been identified and/or approved based on the preliminary analysis. Engineers or developers may be required to create such patch-specific tests, and those users may be notified by the system of such a requirement by the orchestrator engine 134 or another associated component of the system. After one or more patch-specific tests have been created and performed on the patched image, the test results are sent to the orchestrator engine 134 from the application test engine 122 at 314.

At 316, if the test results indicate that the patch is approved for deployment, the orchestrator engine 134 publishes the patch to consumers (e.g., consumer computing devices 132) based on those results. In some examples, publishing the approved patch or patches includes storing the patches on an approved patch repository (e.g., approved patch repository 130) and pushing the patches to consumer computing devices or otherwise notifying consumer computing devices that the patches are ready for consumption, as described herein.

Figure 4:
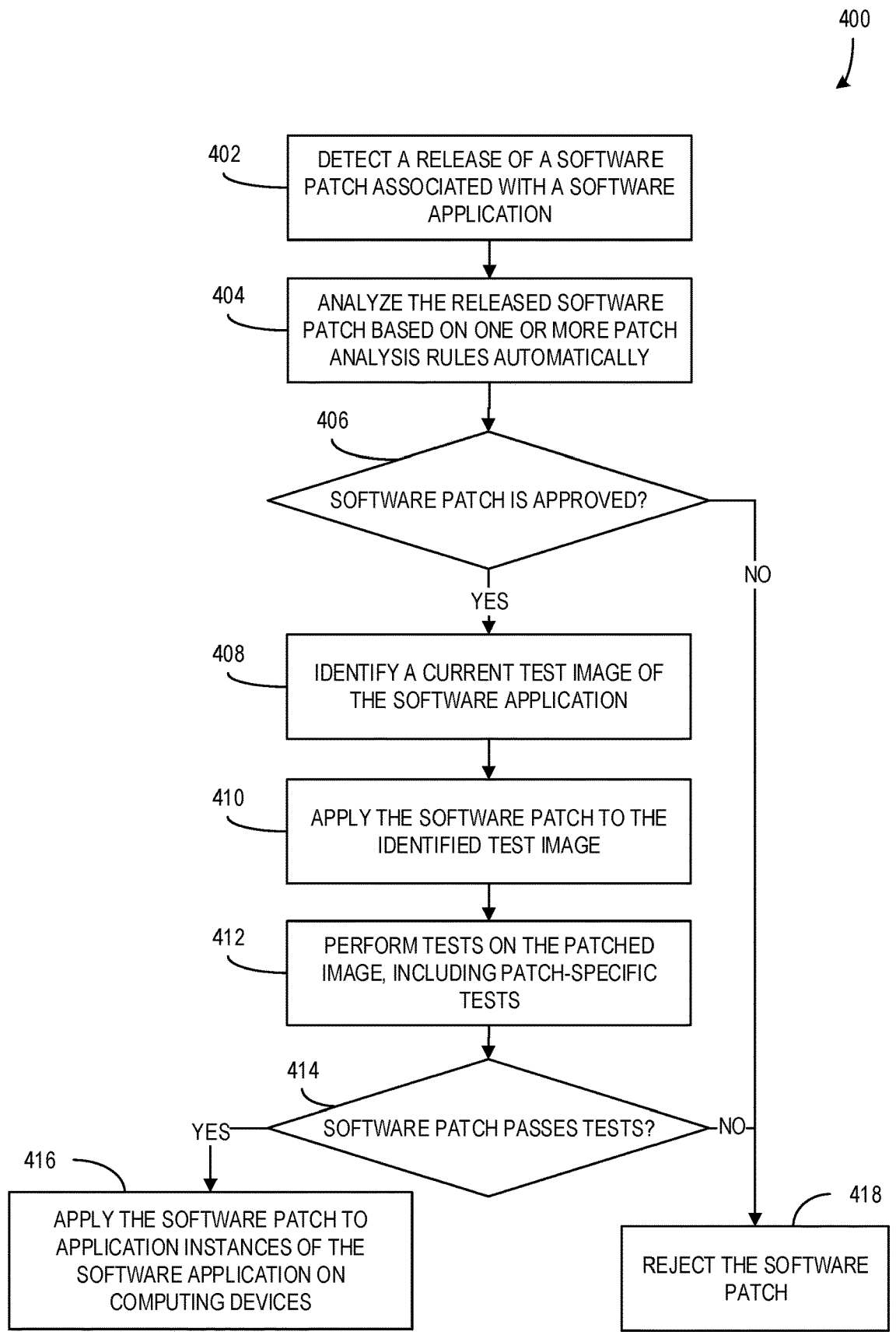
FIG. 4 is a flow chart illustrating a computerized method for identifying, testing, and deploying patches from an application patch source according to an embodiment.

FIG. 4 is a flow chart illustrating a computerized method 400 for identifying, testing, and deploying patches from an application patch source according to an embodiment. In some examples, the method 400 is performed by one or more components (e.g., a patch orchestrator module 102) of a system such as system 100 as described above with respect to FIG. 1. At 402, a release of a software patch associated with a software application is detected. In some examples, information about the release of the patch is provided at a patch source (e.g., application patch source 104) to a patch watcher component (e.g., patch watcher 248) of the orchestrator. At 404, the released software patch is automatically analyzed based on one or more patch analysis rules to determine whether the software patch will be downloaded, tested, and potentially deployed to other computer devices in the system. In some examples, the software patch is obtained from the application patch source to perform the analysis. Alternatively, the orchestrator may download or otherwise obtain preliminary data associated with the software patch upon which to perform the analysis, such that the actual software patch is only obtained after the analysis is complete and it indicates that the software patch is to be tested. In some examples, the analysis includes application of a plurality of rules that determine whether the patch is needed, what the patch does (e.g., what vulnerabilities it addresses), and/or other effects of the patch, such as downtime needed to deploy and/or install it, as described herein.

At 406, if the software patch is approved based on the analysis, the process proceeds to 408. Alternatively, if the software patch is not approved based on the analysis, the process proceeds to 418, where the software patch is rejected. In some cases, rejection of the software patch at this point indicates that the software patch should not be downloaded or otherwise obtained in its entirety from the application patch source.

At 408, after the software patch is approved, a current test image of the software application is identified. In some examples, this identification may include identifying a current version of the software application and generation of a test image based on the identified current version of the application. At 410, the software patch is applied to the identified test image to form a patched image and, at 412, tests are performed on the patched image, including patch-specific tests (e.g., tests that test aspects of the application that are changed by the patch). In some examples, the tests are performed by an application test engine (e.g., application test engine 122) as described herein.

At 414, if the software patch passes the tests (e.g., the patched image passes all of the tests or a defined quantity or percentage of the tests), the process proceeds to 416. Alternatively, if the software patch does not pass the tests, the process proceeds to 418, where the software patch is rejected. In some examples, rejection of the software patch further includes logging of the test results for review by users of the system, as described herein.

At 416, the software patch is applied to application instances or images of the software application on computing devices of the system (e.g., consumer computing devices 132). In some examples, the application of the patch includes pushing the patch to all computing devices upon which the application is installed on the system. Alternatively, the patched image which has passed the tests may itself be provided to the computing devices to replace the current version of the application. For instance, if the application is an operating system of the computing devices, application of the software patch may include sending the patched image of the operating system (OS) to all consumer computing devices and causing those devices to install the patched image as an OS and to, in some cases, replace older versions of the OS with the patched image.

Figure 5:
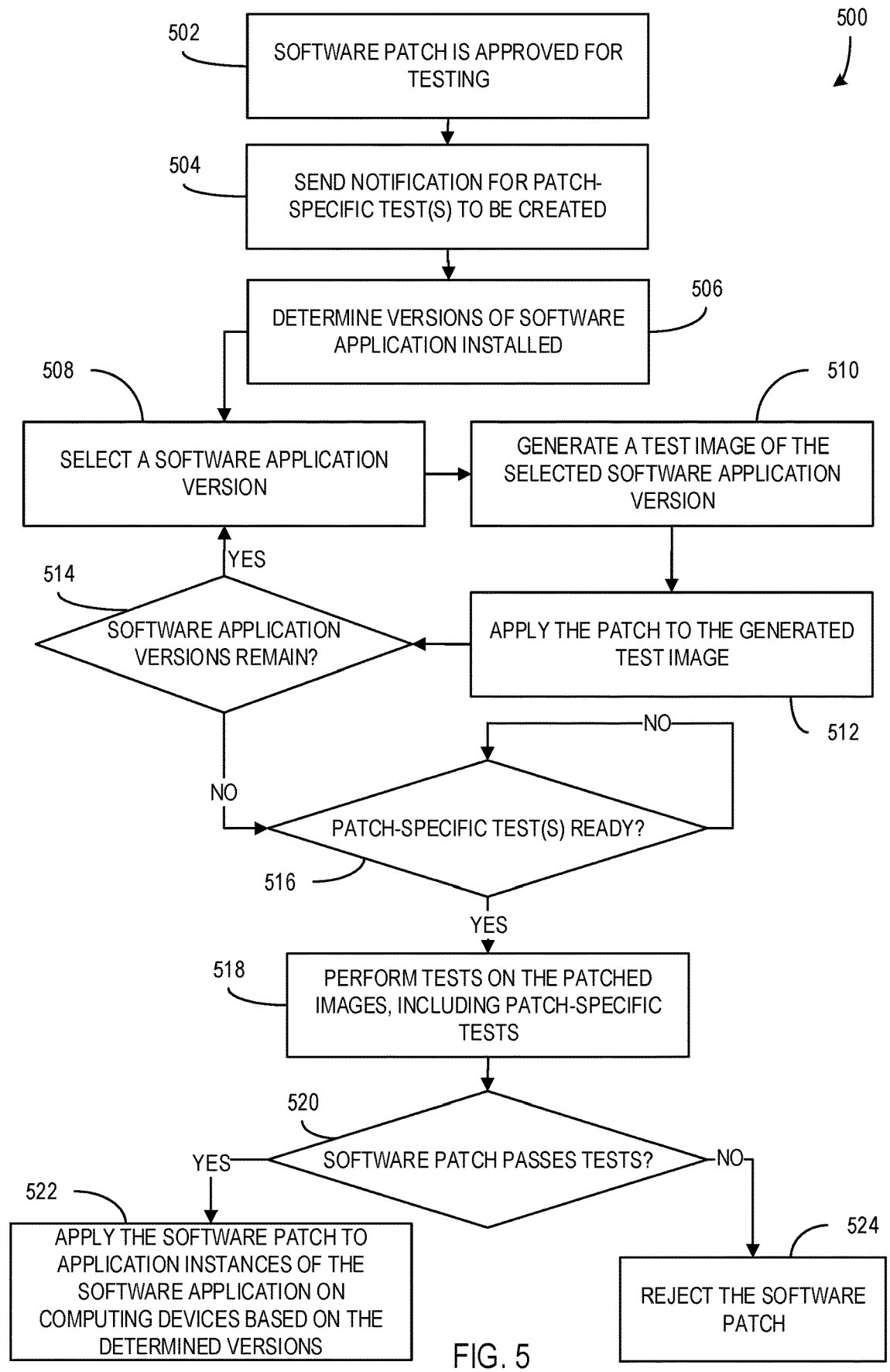
FIG. 5 is a flow chart illustrating a computerized method for automatically testing patches across multiple versions of software applications and deploying patches based on the testing according to an embodiment.

FIG. 5 is a flow chart illustrating a computerized method 500 for automatically testing patches across multiple versions of software applications and deploying patches based on the testing according to an embodiment. In some examples, the method 500 is performed or otherwise executed by one or more components of a system such as system 100 as described above with respect to FIG. 1. At 502, the software patch is approved for testing. It should be understood that the process of approving the software patch may include operations as described above with respect to 402-406 of FIG. 4.

At 504, a notification is sent for patch-specific test(s) to be created. In some examples, the notification is sent to one or more users of the system, such as engineers or technicians, who can create tests that can be automatically run by the described system and that test the specific changes, features, or other aspects of the patch. Alternatively, or additionally, some or all of the patch-specific tests may be generated automatically by the orchestrator as described herein.

At 506, the versions of the software application installed within the system are determined. The determined versions may include different versions of the application that are installed on different computing devices, versions of the application configured to run on different types of computing devices (e.g., differences between server devices and personal computers), and/or similar versions of the application with different sets of patches already installed. At 508, a software application version from the determined versions is selected and, at 510, a test image of the selected software application version is generated. Alternatively, if a test image of the software application version has already been generated, that image may be used. At 512, the patch is applied to the generated test image to form a patched image of the selected software application version.

At 514, if software application versions remain in the determined versions of software applications, the process returns to 508 select another software application version and generate an associated patched image. Alternatively, if no software application version remains for which to generate a patched image, the process proceeds to 516.

At 516, if the patch-specific test(s) are ready to be performed, the process proceeds to 518. Alternatively, if the patch-specific test(s) are not ready to be performed, the process waits until they are ready. In alternative examples, the process may proceed to run some of the tests as described herein but wait until the patch-specific tests are ready and performed to complete the testing process.

At 518, the tests, including the patch-specific tests, are performed on each of the patched images for each of the software application versions. At 520, if the patched images and the associated software patch passes the tests, the process proceeds to 522, where the software patch is applied to application instances of the software application on computing devices of the system, as described above with respect to 416 of FIG. 4. Alternatively, if the software patch does not pass the tests, the process proceeds to 524, where the software patch is rejected. In some examples, the software patch passes the tests for some of the software application versions and does not pass the tests for other software application versions, based on testing the associated patched images. In such cases, the process may apply or reject the software patch for each software application version, such that application instances of software application versions for which the software patch passed the tests have the software patch applied, while application instances of software application versions for which the software patch did not pass the tests do not have the patch applied.

Additional Example Scenarios

Aspects of the disclosure enable various additional scenarios, such as next described.

In an example, an orchestrator module of a distributed computing system detects that a new patch is available for an OS that is being used in the computing system. The orchestrator module obtains the new patch from the source of the OS patch. The patch is then analyzed by a patch analysis engine of the orchestrator module. The patch analysis engine applies a plurality of patch analysis rules, including a vulnerability rule that determines whether patches address a recently detected vulnerability of the OS. The patch analysis engine determines that the new patch does address the recently detected vulnerability and, as a result, the new patch is approved for testing and potential deployment.

The new patch is provided to the application test engine of the patch orchestrator. The test engine identifies a test image of the OS that is up to date with the current state of the OS as installed on the computing devices of the system. The test engine applies the new patch to the test image of the OS to form a patched image of the OS. At the same time, the application test engine notifies a user of the system that a patch-specific test or tests should be created for testing the patch.

The test engine performs a set of tests on the patched image of the OS. A portion of the tests are general tests of the OS that are used to confirm that the patch has not negatively affected the functionality of the OS in general. Upon patch-specific tests of the patch being created by the notified user, those patch-specific tests are also run on the patched image of the OS. The test engine determines that the new patch is approved for deployment and the new patch is transferred to an approved patch repository.

Consumer computing devices of the system that include the OS detect the presence of the new patch in the approved patch repository. The consumer computing devices access and apply the new patch and, as a result, the new patch is deployed, and the recently detected vulnerability is addressed throughout the system.

Exemplary Operating Environment

Figure 6:
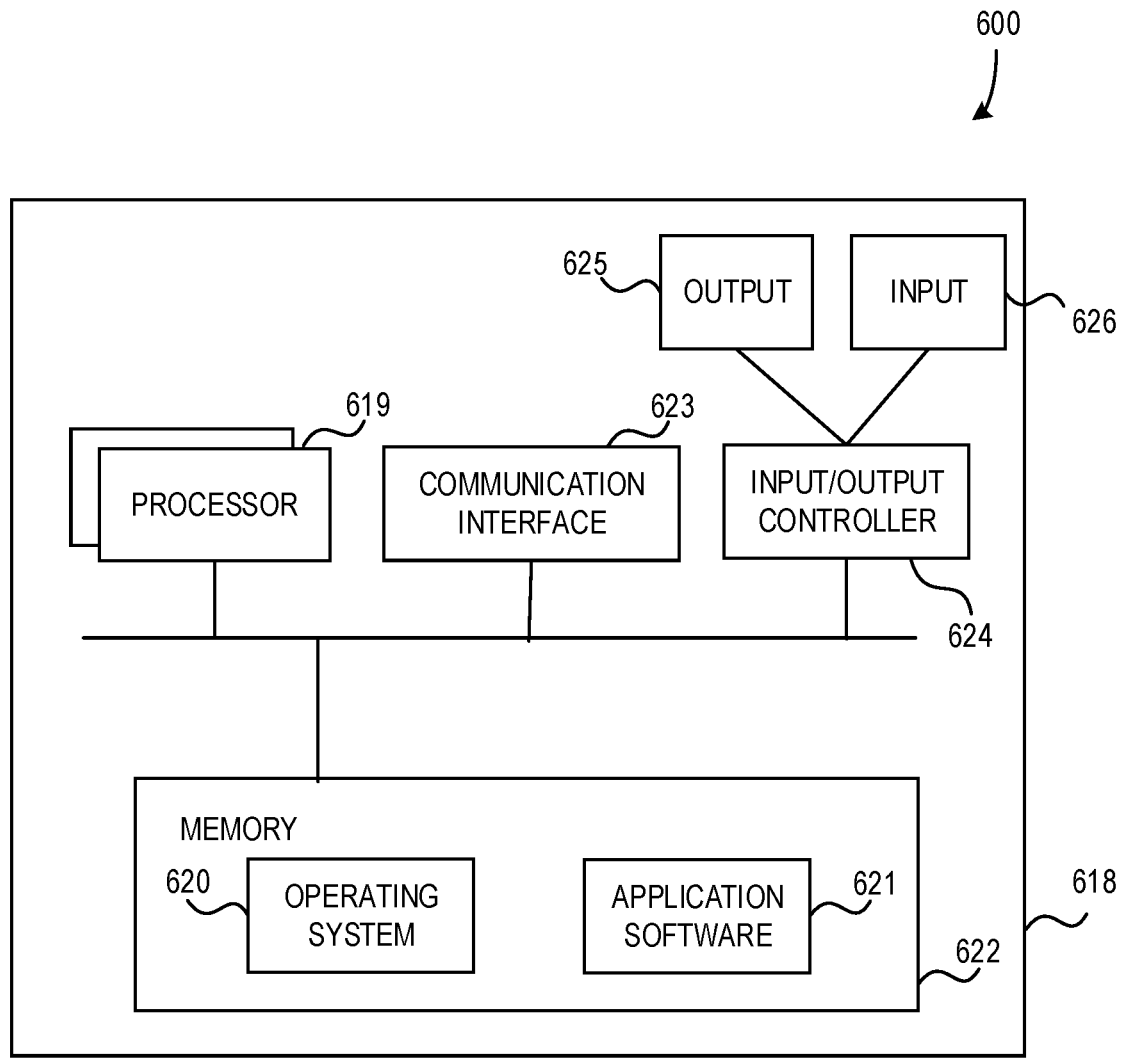
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Alternatively, or in addition, the processor 619 is any technology capable of executing logic or instructions, such as a hard-coded machine. Platform software comprising an operating system 620 or any other suitable platform software may be provided on the apparatus 618 to enable application software 621 to be executed on the device. According to an embodiment, managing software patch deployment based on rule-based analysis and testing as described herein may be accomplished by software, hardware, and/or firmware.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device (s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for managing software patches for software applications of computing devices comprises: at least one processor; and at least one memory comprising computer program code, the at least one memory and the computer program code configured to, with the at least one processor, cause the at least one processor to: detect a release of a software patch associated with a software application of the software applications of the computing devices; analyze the released software patch based on one or more patch analysis rules automatically, wherein the one or more patch analysis rules are configured to indicate whether the released software patch is to be applied to the software application, wherein the patch analysis rules include at least one vulnerability rule configured to indicate whether the released software patch addresses a known vulnerability; based on the analysis of the released software patch resulting in approval of installation of the released software patch, identify a current test image of the software application with which the software patch is associated; apply the released software patch to the identified test image of the software application to form a patched image of the software application; perform one or more tests on the patched image of the software application, wherein the one or more tests include at least one test configured to test the patched image based on at least one change made during application of the software patch; and based on tests results of the one or more tests indicating that the patched test image passed at least a subset of the performed one or more tests, apply the released software patch to at least one application instance of the software application on the computing devices, whereby the released software patch is deployed to the computing devices.

A computerized method for managing software patches for software applications of computing devices comprises: detecting, by the processor, a release of a software patch associated with a software application of the software applications of the computing devices; analyzing, by the processor, the released software patch based on one or more patch analysis rules automatically, wherein the one or more patch analysis rules are configured to indicate whether the released software patch is to be applied to the software application, wherein the patch analysis rules include at least one vulnerability rule configured to indicate whether the released software patch addresses a known vulnerability; based on the analysis of the released software patch resulting in approval of installation of the released software patch, identifying, by the processor, a current test image of the software application with which the software patch is associated; applying, by the processor, the released software patch to the identified test image of the software application to form a patched image of the software application; performing, by the processor, one or more tests on the patched image of the software application, wherein the one or more tests include at least one test configured to test the patched image based on at least one change made during application of the software patch; and based on tests results of the one or more tests indicating that the patched test image passed at least a subset of the performed one or more tests, applying, by the processor, the released software patch to at least one application instance of the software application on the computing devices, whereby the released software patch is deployed to the computing devices.

One or more non-transitory computer storage media having computer-executable instructions for managing software patches for software applications of computing devices that, upon execution by a processor, causes the processor to at least: detect a release of a software patch associated with a software application of the software applications of the computing devices; analyze the released software patch based on one or more patch analysis rules automatically, wherein the one or more patch analysis rules are configured to indicate whether the released software patch is to be applied to the software application, wherein the patch analysis rules include at least one vulnerability rule configured to indicate whether the released software patch addresses a known vulnerability; based on the analysis of the released software patch resulting in approval of installation of the released software patch, identify a current test image of the software application with which the software patch is associated; apply the released software patch to the identified test image of the software application to form a patched image of the software application; perform one or more tests on the patched image of the software application, wherein the one or more tests include at least one test configured to test the patched image based on at least one change made during application of the software patch; and based on tests results of the one or more tests indicating that the patched test image passed at least a subset of the performed one or more tests, apply the released software patch to at least one application instance of the software application on the computing devices, whereby the released software patch is deployed to the computing devices.

Alternatively, or in addition to the other examples described herein, examples include any combination of the following:

wherein the one or more patch analysis rules further include at least one of applicability rules configured to indicate whether the released software patch applies to software applications of the computing devices, patch relation rules configured to indicate whether the released software patch is related to other software patches, or system outage rules configured to determine whether installation of the released software patch causes a system outage and how long such a system outage will be.

wherein the one or more patch analysis rules includes a plurality of patch analysis rules; and wherein analyzing the released software patch based on one or more patch analysis rules further includes: generating a result value from each patch analysis rule of the plurality of patch analysis rules based the released software patch; combining the generated result values of the plurality of patch analysis rules into an aggregate score value associated with the released software patch; based on the aggregate score value associated with the released software patch meeting or exceeding a threshold value, indicating approval of the released software patch for installation; and based on the aggregate score value associated with the released software patch failing to meet or exceed the threshold value, indicating denial of the released software patch.

further comprising: detecting, by the processor, a release of vulnerability data associated with a vulnerability associated with one or more of the software applications of the computing devices; generating, by the processor, at least one vulnerability rule based on the vulnerability data, wherein the generated at least one vulnerability rule is configured to determine whether a software patch addresses vulnerability with which the vulnerability data is associated; and updating, by the processor, the one or more patch analysis rules to include the generated at least one vulnerability rule.

wherein identifying the test image of the software application further includes: determining a version of the software application installed on at least one computing device of the computing devices; generating an application image of the determined version of the software application; and installing the generated application image to a virtual computing instance of a testing environment to form the testing image.

wherein determining the version of the software application includes determining a plurality of versions of the software application installed on the computing devices; wherein generating the application image of the determined version of the software application includes generating an application image for each version of the determined plurality of versions of the software application; wherein installing the generated application image to a virtual computing instance of a testing environment includes installing each generated application image for each version of the determined plurality of versions of the software application to a separate virtual computing instance of the testing environment to form a testing image for each generated application image; wherein the released software patch is applied to each testing image to form a plurality of patched images and the one or more tests are performed on each patched image of the plurality of patched images; and wherein applying the released software patch to at least one application instance of the software application on the computing devices includes applying the released software patch to at least one application instance of the software application on the computing devices based on the results of the performed one or more tests on each patched image of the plurality of patched images.

wherein the one or more tests further include at least one of unit tests, integration tests, regression tests, performance tests, or smoke tests.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for detecting, by the processor, a release of a software patch associated with a software application of the software applications of the computing devices; exemplary means for analyzing, by the processor, the released software patch based on one or more patch analysis rules automatically, wherein the one or more patch analysis rules are configured to indicate whether the released software patch is to be applied to the software application, wherein the patch analysis rules include at least one vulnerability rule configured to indicate whether the released software patch addresses a known vulnerability; based on the analysis of the released software patch resulting in approval of installation of the released software patch, exemplary means for identifying, by the processor, a current test image of the software application with which the software patch is associated; exemplary means for applying, by the processor, the released software patch to the identified test image of the software application to form a patched image of the software application; exemplary means for performing, by the processor, one or more tests on the patched image of the software application, wherein the one or more tests include at least one test configured to test the patched image based on at least one change made during application of the software patch; and based on tests results of the one or more tests indicating that the patched test image passed at least a subset of the performed one or more tests, exemplary means for applying, by the processor, the released software patch to at least one application instance of the software application on the computing devices, whereby the released software patch is deployed to the computing devices.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for managing software patches for software applications of computing devices, the system comprising:
   at least one processor; and
   at least one memory comprising computer program code, the at least one memory and the computer program code configured to, with the at least one processor, cause the at least one processor to:
   detect a release of a software patch associated with a software application of the software applications of the computing devices;
   analyze data or metadata of the released software patch based on one or more patch analysis rules automatically, wherein the one or more patch analysis rules are configured to indicate whether the released software patch is to be applied to the software application, wherein the patch analysis rules include at least one vulnerability rule configured to indicate whether the released software patch addresses a known vulnerability;
   based on the analysis of the released software patch resulting in approval of installation of the released software patch, identify a current test image of the software application with which the software patch is associated;
   apply the released software patch to the identified test image of the software application to form a patched image of the software application;
   perform one or more tests on the patched image of the software application, wherein the one or more tests include at least one test configured to test the patched image based on at least one change made during application of the software patch; and
   based on results of the one or more tests indicating that the patched test image passed at least a subset of the performed one or more tests, apply the released software patch to at least one application instance of the software application on the computing devices, whereby the released software patch is deployed to the computing devices.

2. The system of claim 1, wherein the one or more patch analysis rules further include system outage rules configured to determine whether installation of the released software patch causes a system outage and how long such a system outage will be.

3. The system of claim 1, wherein the one or more patch analysis rules includes a plurality of patch analysis rules; and
   wherein analyzing the data or metadata of the released software patch based on one or more patch analysis rules further includes:
   generating a result value from each patch analysis rule of the plurality of patch analysis rules based on the released software patch;
   combining the generated result values of the plurality of patch analysis rules into an aggregate score value associated with the released software patch;
   based on the aggregate score value associated with the released software patch meeting or exceeding a threshold value, indicating approval of the released software patch for installation; and
   based on the aggregate score value associated with the released software patch failing to meet or exceed the threshold value, indicating denial of the released software patch.

4. The system of claim 1, wherein the at least one memory and the computer program code are configured to, with the at least one processor, further cause the processor to:
   detect a release of vulnerability data associated with a vulnerability associated with one or more of the software applications of the computing devices;
   generate at least one vulnerability rule based on the vulnerability data, wherein the generated at least one vulnerability rule is configured to determine whether a software patch addresses vulnerability with which the vulnerability data is associated; and
   update the one or more patch analysis rules to include the generated at least one vulnerability rule.

5. The system of claim 1, wherein identifying the test image of the software application further includes:
   determining a version of the software application installed on at least one computing device of the computing devices;

generating an application image of the determined version of the software application; and installing the generated application image to a virtual computing instance of a testing environment to form the test image.

6. The system of claim 5, wherein determining the version of the software application includes determining a plurality of versions of the software application installed on the computing devices;

wherein generating the application image of the determined version of the software application includes generating an application image for each version of the determined plurality of versions of the software application;

wherein installing the generated application image to a virtual computing instance of a testing environment includes installing each generated application image for each version of the determined plurality of versions of the software application to a separate virtual computing instance of the testing environment to form a testing image for each generated application image;

wherein the released software patch is applied to each testing image to form a plurality of patched images and the one or more tests are performed on each patched image of the plurality of patched images; and wherein applying the released software patch to at least one application instance of the software application on the computing devices includes applying the released software patch to at least one application instance of the software application on the computing devices based on the results of the performed one or more tests on each patched image of the plurality of patched images.

7. The system of claim 1, wherein the one or more tests further include at least one of unit tests, integration tests, regression tests, performance tests, or smoke tests.

8. A computerized method for managing software patches for software applications of computing devices, the method comprising:

detecting, by a processor, a release of a software patch associated with a software application of the software applications of the computing devices;

analyzing, by the processor, data or metadata of the released software patch based on one or more patch analysis rules automatically, wherein the one or more patch analysis rules are configured to indicate whether the released software patch is to be applied to the software application, wherein the patch analysis rules include at least one vulnerability rule configured to indicate whether the released software patch addresses a known vulnerability;

based on the analysis of the released software patch resulting in approval of installation of the released software patch, identifying, by the processor, a current test image of the software application with which the software patch is associated;

applying, by the processor, the released software patch to the identified test image of the software application to form a patched image of the software application;

performing, by the processor, one or more tests on the patched image of the software application, wherein the one or more tests include at least one test configured to test the patched image based on at least one change made during application of the software patch; and based on results of the one or more tests indicating that the patched image passed at least a subset of the one or more tests, applying, by the processor, the released software patch to at least one application instance of the software application on the computing devices, whereby the released software patch is deployed to the computing devices.

9. The computerized method of claim 8, wherein the one or more patch analysis rules further include at least one of applicability rules configured to indicate whether the released software patch applies to software applications of the computing devices, patch relation rules configured to indicate whether the released software patch is related to other software patches, or system outage rules configured to determine whether installation of the released software patch causes a system outage and how long such a system outage will be.

10. The computerized method of claim 8, wherein the one or more patch analysis rules includes a plurality of patch analysis rules; and wherein analyzing data or metadata of the released software patch based on one or more patch analysis rules further includes:

generating a result value from each patch analysis rule of the plurality of patch analysis rules based the released software patch;

combining the generated result values of the plurality of patch analysis rules into an aggregate score value associated with the released software patch;

based on the aggregate score value associated with the released software patch meeting or exceeding a threshold value, indicating approval of the released software patch for installation; and based on the aggregate score value associated with the released software patch failing to meet or exceed the threshold value, indicating denial of the released software patch.

11. The computerized method of claim 8, further comprising:

detecting, by the processor, a release of vulnerability data associated with a vulnerability associated with one or more of the software applications of the computing devices;

generating, by the processor, at least one vulnerability rule based on the vulnerability data, wherein the generated at least one vulnerability rule is configured to determine whether a software patch addresses vulnerability with which the vulnerability data is associated; and updating, by the processor, the one or more patch analysis rules to include the generated at least one vulnerability rule.

12. The computerized method of claim 8, wherein identifying the test image of the software application further includes:

determining a version of the software application installed on at least one computing device of the computing devices;

generating an application image of the determined version of the software application; and installing the generated application image to a virtual computing instance of a testing environment to form the test image.

13. The computerized method of claim 12, wherein determining the version of the software application includes determining a plurality of versions of the software application installed on the computing devices;

wherein generating the application image of the determined version of the software application includes generating an application image for each version of the determined plurality of versions of the software application;

wherein installing the generated application image to a virtual computing instance of a testing environment includes installing each generated application image for each version of the determined plurality of versions of the software application to a separate virtual computing instance of the testing environment to form a testing image for each generated application image;

wherein the released software patch is applied to each testing image to form a plurality of patched images and the one or more tests are performed on each patched image of the plurality of patched images; and wherein applying the released software patch to at least one application instance of the software application on the computing devices includes applying the released software patch to at least one application instance of the software application on the computing devices based on the results of the performed one or more tests on each patched image of the plurality of patched images.

14. One or more non-transitory computer storage media having computer-executable instructions for managing software patches for software applications of computing devices that, upon execution by a processor, cause the processor to at least:

detect a release of a software patch associated with a software application of the software applications of the computing devices;

analyze data or metadata of the released software patch based on one or more patch analysis rules automatically, wherein the one or more patch analysis rules are configured to indicate whether the released software patch is to be applied to the software application, wherein the patch analysis rules include at least one vulnerability rule configured to indicate whether the released software patch addresses a known vulnerability;

based on the analysis of the released software patch resulting in approval of installation of the released software patch, identify a current test image of the software application with which the software patch is associated;

apply the released software patch to the identified test image of the software application to form a patched image of the software application;

perform one or more tests on the patched image of the software application, wherein the one or more tests include at least one test configured to test the patched image based on at least one change made during application of the software patch; and based on results of the one or more tests indicating that the patched image passed at least a subset of the performed one or more tests, apply the released software patch to at least one application instance of the software application on the computing devices, whereby the released software patch is deployed to the computing devices.

15. The one or more non-transitory computer storage media of claim 14, wherein the one or more patch analysis rules further include at least one of applicability rules configured to indicate whether the released software patch applies to software applications of the computing devices, patch relation rules configured to indicate whether the released software patch is related to other software patches, or system outage rules configured to determine whether installation of the released software patch causes a system outage and how long such a system outage will be.

16. The one or more non-transitory computer storage media of claim 14, wherein the one or more patch analysis rules includes a plurality of patch analysis rules; and wherein analyzing the data or metadata of the released software patch based on one or more patch analysis rules further includes:

generating a result value from each patch analysis rule of the plurality of patch analysis rules based on the released software patch;

combining the generated result values of the plurality of patch analysis rules into an aggregate score value associated with the released software patch;

based on the aggregate score value associated with the released software patch meeting or exceeding a threshold value, indicating approval of the released software patch for installation; and based on the aggregate score value associated with the released software patch failing to meet or exceed the threshold value, indicating denial of the released software patch.

17. The one or more non-transitory computer storage media of claim 14, wherein the computer-executable instructions, upon execution by the processor, further cause the processor to at least:

detect a release of vulnerability data associated with a vulnerability associated with one or more of the software applications of the computing devices;

generate at least one vulnerability rule based on the vulnerability data, wherein the generated at least one vulnerability rule is configured to determine whether a software patch addresses vulnerability with which the vulnerability data is associated; and update the one or more patch analysis rules to include the generated at least one vulnerability rule.

18. The one or more non-transitory computer storage media of claim 14, wherein identifying the test image of the software application further includes:

determining a version of the software application installed on at least one computing device of the computing devices;

generating an application image of the determined version of the software application; and installing the generated application image to a virtual computing instance of a testing environment to form the test image.

19. The one or more non-transitory computer storage media of claim 18, wherein determining the version of the software application includes determining a plurality of versions of the software application installed on the computing devices;

wherein generating the application image of the determined version of the software application includes generating an application image for each version of the determined plurality of versions of the software application;

wherein installing the generated application image to a virtual computing instance of a testing environment includes installing each generated application image for each version of the determined plurality of versions of the software application to a separate virtual computing instance of the testing environment to form a testing image for each generated application image;

wherein the released software patch is applied to each testing image to form a plurality of patched images and the one or more tests are performed on each patched image of the plurality of patched images; and wherein applying the released software patch to at least one application instance of the software application on the computing devices includes applying the released software patch to at least one application instance of the software application on the computing devices based on the results of the performed one or more tests on each patched image of the plurality of patched images.

20. The computerized method of claim 10, further comprising:
  determining that the released software patch addresses an important or urgent vulnerability; and
  reducing the threshold value prior to determining whether the aggregate score value meets or exceeds, or fails to meet or exceed, the threshold value.

* * * * *